(12) United States Patent
Donescu et al.

(10) Patent No.: US 9,742,303 B2
(45) Date of Patent: Aug. 22, 2017

(54) POWER CONVERSION SYSTEM WITH RE-CONFIGURABLE POWER FLOW

(71) Applicant: VESTAS WIND SYSTEMS A/S, Aarhus N (DK)

(72) Inventors: Victor Donescu, Westford, MA (US); Peter Mongeau, Center Conway, NH (US)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/025,053

(22) PCT Filed: Jan. 15, 2014

(86) PCT No.: PCT/DK2014/050008
§ 371 (c)(1),
(2) Date: Mar. 25, 2016

(87) PCT Pub. No.: WO2015/043600
PCT Pub. Date: Apr. 2, 2015

(65) Prior Publication Data
US 2016/0241154 A1 Aug. 18, 2016

Related U.S. Application Data

(60) Provisional application No. 61/882,800, filed on Sep. 26, 2013.

(51) Int. Cl.
*H02M 5/458* (2006.01)
*H02M 7/493* (2007.01)
(Continued)

(52) U.S. Cl.
CPC ............ *H02M 5/458* (2013.01); *H02J 3/382* (2013.01); *H02J 3/386* (2013.01); *H02M 7/493* (2013.01);
(Continued)

(58) Field of Classification Search
CPC ................ H02M 7/493; H02M 5/458; H02M 2001/0032; H02M 2001/007;
(Continued)

(56) References Cited

U.S. PATENT DOCUMENTS 6,198,642 B1 * 3/2001 Kociecki ............. H02M 1/4225
307/150
2005/0201127 A1 9/2005 Tracy et al.
(Continued)

FOREIGN PATENT DOCUMENTS

| EP | 1768223 A2 | 3/2007 |
|---|---|---|
| WO | 2009027520 A2 | 3/2009 |
| WO | 2010000315 A1 | 1/2010 |

OTHER PUBLICATIONS

International Search Report for PCT/DK2014/050008, Jan. 15, 2014.

*Primary Examiner* — Adolf Berhane
*Assistant Examiner* — Henry Lee, III
(74) *Attorney, Agent, or Firm* — Patterson + Sheridan, LLP

(57) ABSTRACT

According to some aspects, a power conversion system for converting electrical power produced by a generator is provided. The power conversion system comprises at least one first power converter configured to convert alternating current from the generator to direct current, at least one second power converter configured to convert the direct current to alternating current, and least one controller configured to reconfigure the at least one first power converter to convert direct current to alternating current and/or to reconfigure the at least one second power converter to convert alternating current to direct current.

13 Claims, 12 Drawing Sheets

(51) Int. Cl.
*H02J 3/38* (2006.01)
*H02M 1/00* (2006.01)
*H02M 7/48* (2007.01)

(52) U.S. Cl.
CPC ............... *H02M 2001/007* (2013.01); *H02M 2001/0032* (2013.01); *H02M 2007/4822* (2013.01); *Y02B 70/16* (2013.01)

(58) Field of Classification Search
CPC ....... H02M 2007/4822; Y02B 70/1441; Y02B 70/16; H02J 3/382; H02J 3/386
See application file for complete search history.

(56) References Cited

U.S. PATENT DOCUMENTS

| | | | |
|---|---|---|---|
| 2009/0283129 A1* | 11/2009 | Foss | H02M 7/493 |
| | | | 136/244 |
| 2012/0063182 A1* | 3/2012 | Laforga Gallo | H02J 3/386 |
| | | | 363/65 |
| 2012/0176088 A1* | 7/2012 | Lee | H02J 3/383 |
| | | | 320/128 |
| 2013/0039104 A1 | 2/2013 | Sharma | |
| 2014/0159506 A1* | 6/2014 | Kim | H02M 3/1584 |
| | | | 307/126 |
| 2014/0273897 A1* | 9/2014 | Drogi | H04B 1/0458 |
| | | | 455/127.3 |

\* cited by examiner

POWER CONVERSION SYSTEM WITH RE-CONFIGURABLE POWER FLOW

BACKGROUND

1. Field of Invention

The techniques described herein relate generally to conversion of electrical power produced by a generator into AC power suitable for distribution or other uses. Such techniques may be used to convert electrical power produced by a wind turbine generator into AC power that may be provided to an electrical grid, for example.

2. Discussion of the Related Art

The modern industrial world requires large amounts of electrical power each and every day. To produce electrical power, electrical generators are designed and manufactured to convert energy from another form into electrical energy. Renewable energy sources to drive electrical generators are of interest and there is a class of generators that produce electrical energy by converting mechanical energy (e.g., from a natural or renewable source) into electrical energy. For example, wind turbine generators are designed to generate electrical power in response to mechanical rotation of turbine blades that capture wind energy and that are mechanically coupled to a rotating shaft that drives a rotor of an electrical generator to produce electrical power.

Various types of generators exist that are designed to convert mechanical rotation into electrical power through a magnetic coupling that produces current in response to a changing magnetic field. Examples of such generators include synchronous generators and induction generators. One example of a synchronous generator is a permanent magnet generator. A permanent magnet generator produces a changing magnetic field using permanent magnets on the rotor. Another example of a synchronous generator is a field-excited generator. A field-excited generator produces a changing magnetic field using an electrical current established through a conductor on the rotor. In a synchronous generator, a changing magnetic field produced by the rotor causes a conductor on the stator to produce electrical current. In an induction generator (e.g., a doubly fed induction generator or DFIG), eddy currents are induced in the rotor using a magnetic field, and the rotation of the rotor produces a rotating magnetic field that induces current in the stator winding. Synchronous and induction generators used in wind turbine generators generally produce alternating current (AC) voltages and currents (i.e., AC power).

The power produced by a wind turbine generator may be provided to an electrical power grid or stored. An electrical power grid (hereafter also referred to as a "grid") typically provides AC power to consumers such as a plant and/or multiple consumers in a region or geographic location. The grid may receive power from one or multiple wind turbines and/or other sources (e.g., coal powered generators) and distribute the power to end-consumers that may be relatively local or may be distributed over a relatively large geographic area or region. As such, the grid may be required to operate in accordance with generally tight specifications with respect to acceptable levels of voltage and frequency (among other specifications), and are often regulated by grid codes established for a particular region. The AC power produced by a wind turbine generator typically cannot be provided directly to the grid, as the voltages produced by a wind turbine generator itself are generally variable in magnitude and frequency and without modification therefore would not likely meet the specifications of the electrical power grid to which it is intended to provide electrical power.

To address this issue, power electronics are typically used to convert the AC power produced by a wind turbine generator into AC power suitable for and expected by the electrical power grid. In a typical design, the power electronics include an alternating current to direct current (AC/DC) conversion module to convert the AC power from the wind turbine into a direct current (DC) voltage, and a direct current to alternating current (DC/AC) conversion module to convert the DC power into AC power suitable for the grid to which the wind turbine is to provide power. Such power electronics may be implemented as a power converter within or as part of a wind turbine and may be coupled to the wind turbine generator at its input and configured to couple to the grid at its output (e.g., through an output pad and/or transformer).

SUMMARY

Some embodiments include a power conversion system for converting electrical power produced by a generator, the power conversion system comprising at least one first power converter configured to convert alternating current from the generator to direct current, at least one second power converter configured to convert the direct current to alternating current, and at least one controller configured to reconfigure the at least one first power converter to convert direct current to alternating current and/or to reconfigure the at least one second power converter to convert alternating current to direct current.

Some embodiments include a method of converting electrical power produced by a generator using a power conversion system comprising at least one first power converter configured to convert alternating current from the generator to direct current and at least one second power converter configured to convert the direct current to alternating current, the method comprising reconfiguring the at least one first power converter to convert direct current to alternating current and/or reconfiguring the at least one second power converter to convert alternating current to direct current.

The foregoing summary is provided by way of illustration and is not intended to be limiting.

BRIEF DESCRIPTION OF DRAWINGS

In the drawings, for purposes of clarity, not every component may be labeled in every drawing. The drawings are not necessarily drawn to scale, with emphasis instead being placed on illustrating various aspects of the techniques and devices described herein.

DETAILED DESCRIPTION

Figure 11:
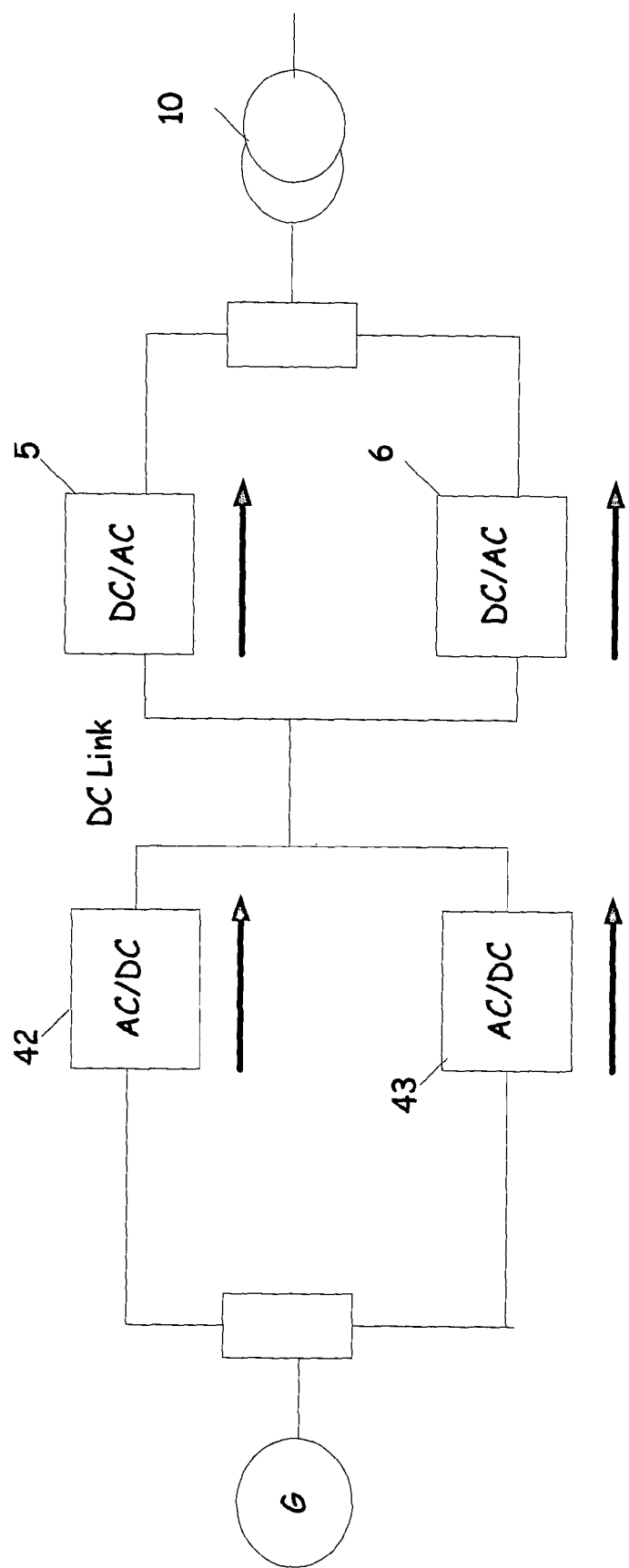
FIG. 11 illustrates a schematic of a conventional system for converting power produced by a generator G into power required by grid 10.

As discussed above, power electronics may be used to convert power produced by a generator (e.g., a wind turbine generator) into power suitable for distribution and/or use (e.g., power provided to and utilized by a grid). FIG. 11 illustrates a schematic of a conventional system for converting power produced by a generator G into power required by grid 10. The power conversion system in FIG. 11 includes two AC/DC conversion modules 42 and 43 on the generator side that convert AC power produced by generator G to DC power. A DC link provides the DC power to DC/AC conversion modules 5 and 6 on the grid side that convert the DC power to AC power in a form suitable for or required by grid 10.

Relatively high-power wind turbine generators can produce power levels of up to one megawatt or higher. To handle such power levels, a plurality of power conversion modules may be connected in parallel such that the relatively high power levels are distributed over multiple parallel components. The exemplary system illustrated in FIG. 11 includes two parallel AC/DC conversion modules on the generator-side and two parallel DC/AC conversion modules on the grid-side, however, any suitable number of conversion modules may be utilized as needed for a given implementation. Power conversion modules utilized in relatively high power generators (e.g., AC/DC conversion modules 42 and 43 and DC/AC conversion modules 5 and 6) are often implemented using one or more switched power converters that use power semiconductor switches (e.g., insulated gate bipolar transistors (IGBTs)) in which current flow through the switch can be turned on and off in response to a control signal provided at a control terminal of the switch. Such semiconductor switches are referred to as "hard commutated devices" or "actively commutated devices."

The inventors have appreciated that many such actively commutated devices have the ability to perform both AC/DC conversion and DC/AC conversion depending on the direction of current flow through the device, and have recognized that this capability may be utilized to produce power conversion systems having one or more benefits and/or advantages over conventional power conversion systems. In particular, the inventors have recognized that power conversion systems that utilize one or more power conversion devices as an AC/DC converter in a first mode and a DC/AC converter in a second mode (referred to herein as dual mode or dual mode operation) may facilitate providing an improved power conversion system in one or more respects, as discussed in further detail below.

According to some embodiments, a power conversion system that comprises at least one power converter configured to operate as an AC/DC converter in a first mode (e.g., under first operating conditions) and configured to operate as a DC/AC converter in a second mode (e.g., under second operating conditions) may facilitate providing a reduced cost and/or more efficient power conversion system. For example, actively commutated semiconductor devices can be relatively expensive. The inventors' have appreciated that operating an actively commutated device in dual mode (e.g., a grid side converter) allows one or more actively commutated devices (e.g., on the generator side) to be replaced with a relatively low-cost rectifier having passively commutated devices, also referred to as "line commutated devices," examples of which include diodes and silicon-controlled rectifiers (SCRs). For example, the two generator side AC/DC conversion modules 42 and 43 in FIG. 11 may be replaced with a single rectifier (e.g., an SCR converter) to produce a lower cost power conversion system (e.g., some embodiments may provide a cost savings of up to approximately 33% or more).

Utilizing a relatively low-cost line commutated device such as a rectifier in conjunction with an actively commutated device operating in dual mode may also provide improved efficiency during power conversion. For example, a rectifier having a line commutated device may provide more efficient AC/DC power conversion than an actively commutated device when the generator is operating at relatively high output power levels. However, when the generator is operating at relatively low output power levels, using a rectifier to perform AC/DC conversion may result in reduced power conversion efficiency. The inventors have appreciated that employing a line commutated device (e.g., an SCR converter) for AC/DC conversion in conjunction with a plurality of actively commutated converters for DC/AC conversion when the generator is producing relatively high power levels and switching the operation mode such that one or more of the actively communicated converters are switched to perform AC/DC conversion in place of, and bypassing, the line commutated device (e.g., SCR converter) when the generator is producing relatively low voltages may provide a more efficient and cost effective power conversion system.

Thus, according to some embodiments, a power conversion system may be configured to operate in a first mode of operation (e.g., a "high power mode") for conversion of relatively high power levels and a second mode of operation (e.g., a "low power mode") for conversion of relatively low power levels. In a high power mode of operation, AC/DC conversion may be performed by a rectifier which may operate with high efficiency at high power levels. The rectifier may provide DC power to a DC link. A plurality of DC/AC power conversion modules may operate in parallel to convert the DC power at the DC link to AC power at the output. In a low power mode of operation, the rectifier may be bypassed. AC/DC conversion may be performed by providing power from the generator to the output of a DC/AC power conversion module (or multiple DC/AC power conversion modules), thereby reversing the direction of power flow therein such that the DC/AC power conversion module operates as an AC/DC power conversion module, providing DC power to the DC link. One or more DC/AC power conversion modules for which the power flow remains the same convert the DC power at the DC link to AC power at the output (e.g., to provide power to the grid). A power conversion module refers herein to one or more power converters (also referred to as power conversion devices) that perform AC/DC and/or DC/AC conversion.

The inventors have further recognized that actively commutated devices configured to operate in a dual mode may also be utilized to provide a measure of protection against failure of one or more other actively communicated devices employed in a power conversion system. Failure of power conversion devices can be costly both from the perspective of replacement costs and costs associated with down time of the generator (e.g., the wind turbine generator). For example, in wind turbines, the power conversion system may be housed relatively high off the ground in the wind turbine's tower. Replacing a failed component generally incurs both the cost of the failed component and labor costs associated with putting trained personnel up in the tower to make the replacement. Furthermore, loss of power during the downtime of the generator (both during replacement and potentially from the moment of component failure should it cause the generator to fault and cease operation) may result in significant revenue loss.

The inventors have appreciated that actively commutated devices configured to operate in a dual mode can provide fault tolerance such that when a power conversion device fails, one or more others may be reconfigured to compensate for the failed component. For example, in a power conversion system having actively commutated devices on the generator side performing AC/DC conversion to a DC link and actively commutated devices on the grid side performing DC/AC conversion from the DC link, when either an AC/DC conversion component fails or a DC/AC conversion component fails, one or more of the actively commutated devices may be reconfigured such that the power flow is reversed through the one or more actively communicated devices operating as an AC/DC converter to then operate as a DC/AC converter or vice-versa to compensate for the failed component(s).

Accordingly, a number of aspects derive from the inventor's insight that the reversibility of certain actively commutated power conversion devices may be exploited to provide a power conversion system that can be dynamically configured by switching the power flow through one or more of the actively commutated devices based on conditions of the power conversion system. Such dynamic configurability of the power conversion system may lead to improved performance, lower cost power conversion systems, or both. The inventor's insight that actively commutated power conversion devices may be dynamically switched between operation modes (i.e., from AC/DC conversion to DC/AC conversion or vice versa) may be utilized in other ways, as the aspects are not limited to any particular application.

Following below are more detailed descriptions of various concepts related to, and embodiments of, methods and apparatus for implementing a power conversion system capable of dynamically switching between operation modes of at least one power converter and applications thereof. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIGS. 1A-1F are schematics of a power conversion system 100 capable of being dynamically configured according to a desired power flow topology, according to a number of different embodiments. Power system 100 includes an AC/DC conversion module 4 which may include a single AC/DC converter or may include multiple AC/DC converters, for example, operating in parallel, and a DC/AC conversion module 5 which may include a single DC/AC converter or may include multiple DC/AC converters, for example, operating in parallel. AC/DC conversion module 4 is positioned on the generator side and coupled to an electrical generator G and DC conversion module 5 is positioned on the grid side and is coupled to grid 10. The AC/DC conversion module 4 and DC/AC conversion module 5 are connected via a DC link. It should be appreciated that while an embodiment having a single AC/DC conversion module 4 and a single DC/AC conversion module 5 is illustrated in FIGS. 1A-1F for clarity of presentation, some embodiments may include multiple AC/DC and DC/AC conversion modules coupled between the generator and the grid, each comprising one or more respective AC/DC and DC/AC converters.

Figure 1A:
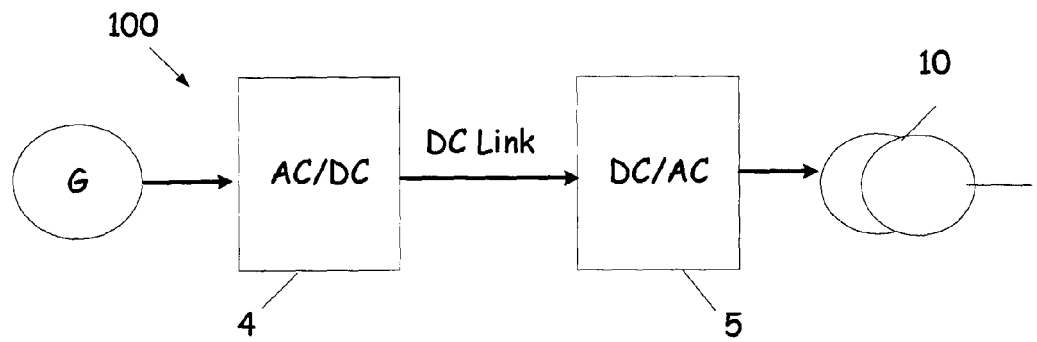
FIGS. 1A-1F are schematic illustrations of power conversion systems capable of being dynamically configured, in accordance with some embodiments.

When one or more of the generator side AC/DC converters and/or one or more of the grid side DC/AC converters are configured to operate in a dual mode, power converter system 100 may be dynamically configured to operate according to a variety of different power flow topologies, some examples of which are illustrated schematically in FIGS. 1A-1F. FIG. 1A illustrates a typical power flow topology wherein power flows from the generator to the AC/DC conversion module 4, through the DC link to the DC/AC conversion module 5 and ultimately to grid 10. In this configuration, the generator side power converters perform AC/DC conversion and the grid side power converters perform DC/AC conversion.

Figure 1B:
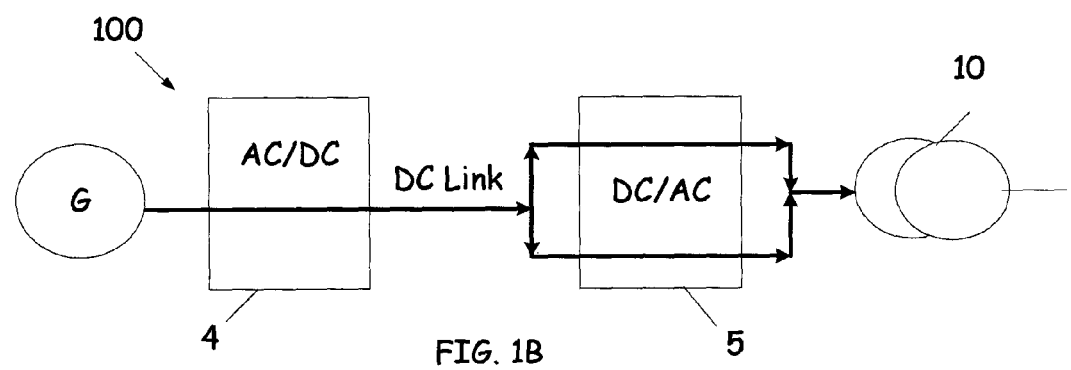
Figure 1C:
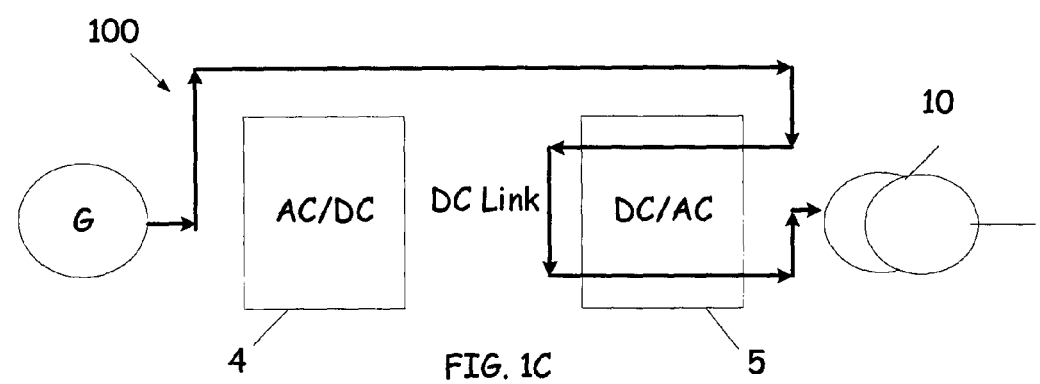

FIG. 1B illustrates a configuration wherein an AC/DC converter of AC/DC conversion module 4 is coupled to multiple DC/AC converters of DC/AC conversion module 5 via the DC link with the general power flow topology illustrated in FIG. 1A. Under certain operating conditions, it may be advantageous to switch to a different power flow topology, for example, based on present power levels being produced by the generator G, failure of one or more converters, etc. FIG. 1C illustrates an example wherein one (or more) of the DC/AC converters on the grid side is configured to operate as an AC/DC by diverting the power flow away from the generator side converter of AC/DC conversion module 4 so that it flows in a reverse fashion through the reconfigured DC/AC converter(s). Reconfiguring the power flow topology as illustrated in FIG. 1C may be beneficial, for example, when the AC/DC converter of AC/DC conversion module 4 is a rectifier (a line commutated device) and the power levels being produced by the generator fall below a power threshold, as discussed in further detail below.

Figure 1D:
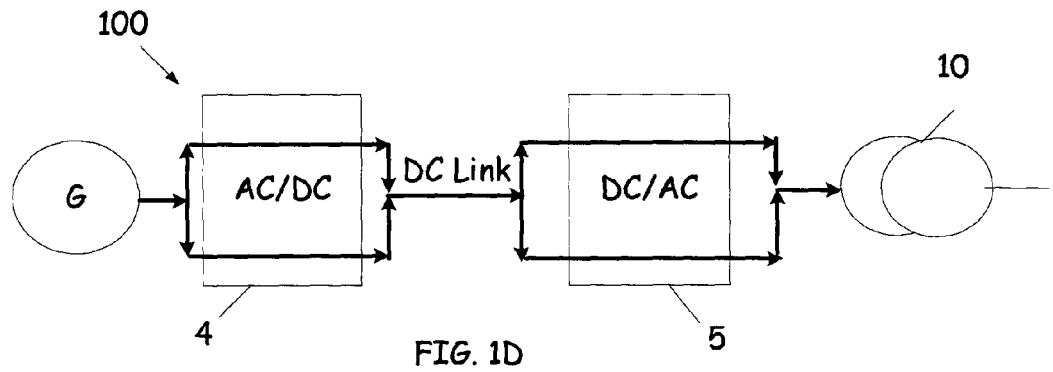
Figure 1E:
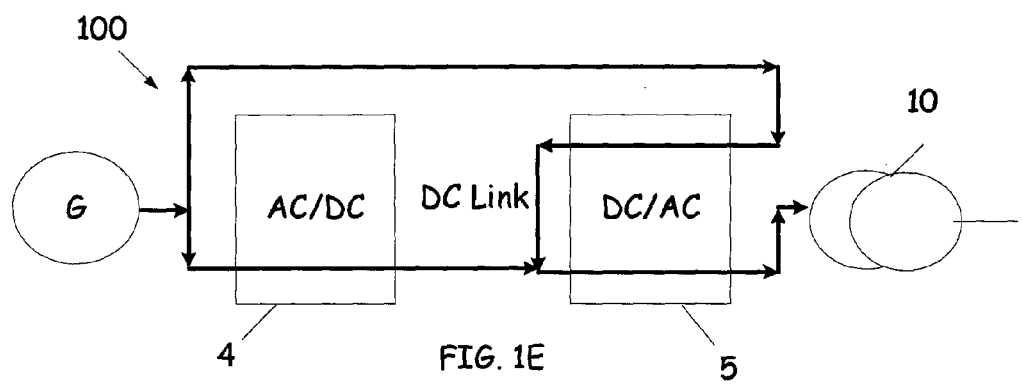
Figure 1F:
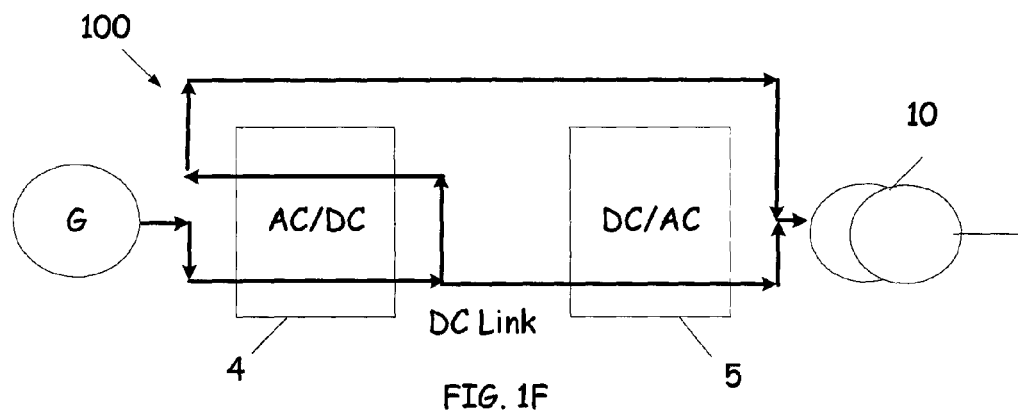

FIG. 1D a configuration where there is generally a one-to-one ratio and/or mapping between AC/DC converters of AC/DC conversion module 4 and DC/AC converters of DC/AC conversion module 5 using the power flow topology illustrated in FIG. 1A. For example, AC/DC conversion module 4 includes two AC/DC converters coupled via the DC link to two DC/AC converters of DC/AC conversion module 5 (e.g., in a configuration similar to that shown in FIG. 1I). As discussed above, under certain operating conditions, it may be advantageous to switch to a different power flow topology. FIG. 1E illustrates an example wherein one (or more) of the DC/AC converters on the grid side is configured to operate as an AC/DC by diverting the power flow away from at least one AC/DC converter of generator side AC/DC conversion module 4 so that it flows in a reverse fashion through the reconfigured DC/AC converter(s). FIG. 1F illustrates an example wherein one (or more) of the AC/DC converters on the generator side is configured to operate as a DC/AC converter by diverting the power flow away from at least one grid side DC/AC converter of DC/AC conversion module 5 so that it flows in a reverse fashion through the reconfigured AC/DC converter(s). Reconfiguring the power flow topology as illustrated in FIGS. 1E and 1F may be beneficial, for example, when one or more generator side converters fail or one or more grid side converters fail, respectively, as discussed in further detail below.

It should be appreciated that FIGS. 1A-1F are schematic to illustrate concepts related to switching power flow topology by reconfiguring one or more converters from an AC/DC converter to a DC/AC converter or vice versa. The one or more converters may be reconfigured and the power flow topology modified using at least one controller coupled to the one or more converters to modify one or more parameters of the respective converter, and coupled to and capable of controlling appropriate switches to create a current path for the desired power flow topology, as discussed in further detail below. The at least one controller may be implemented in hardware, software, firmware or any combination thereof, as the aspects are not limited to any particular implementation in this respect.

Figure 2:
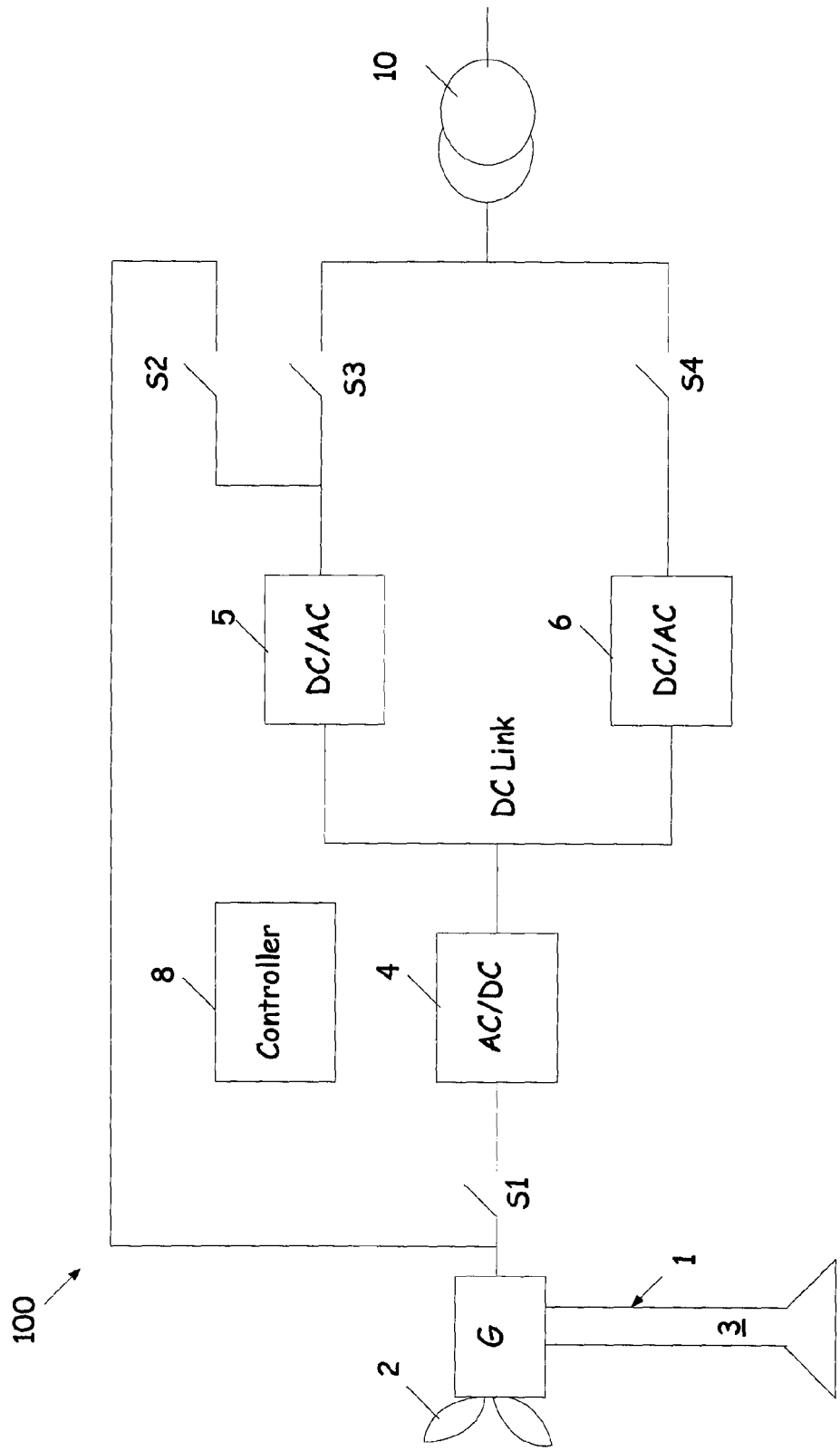
FIG. 2 shows a diagram of a power conversion system in which power flow may be reversed in a grid-side power conversion module, according to some embodiments.

FIG. 2 shows a diagram of a power conversion system 100, according to some embodiments. The power conversion system 100 receives AC power from a generator G, schematically illustrated as being part of a wind turbine generator 1, though generator G need not be part of a wind turbine. In some embodiments, generator G may be a synchronous generator. If generator G is part of a wind turbine generator 1, wind turbine generator 1 may include a plurality of wind turbine blades 2 mechanically coupled to a shaft (not shown) that drives the rotor of generator G. Wind turbine generator 1 may include a support structure 3 to position the wind turbine blades, the shaft and/or the generator G at a suitable height. However, the techniques described herein are not limited to conversion of power produced by wind turbine generators, as they are applicable to generators driven by energy sources other than wind energy.

The power conversion system 100 includes an AC/DC conversion module 4, a DC/AC conversion module 5, a DC/AC conversion module 6, a controller 8, and switches S1-S4. As discussed above, AC/DC conversion module 4 may be considered a generator side conversion module and DC/AC conversion modules 5 and 6 may be considered grid side conversion modules. Each of power conversion modules 4-6 may include a single power converter or a plurality of power converters connected in parallel. Switches S1-S4 may be any suitable switching hardware capable of conducting current when closed and preventing current flow when open (e.g., switching hardware such as switchgear). In the example of FIG. 1, the power conversion system 100 has an output connected to grid 10 to supply power thereto.

Although not illustrated in FIG. 1 (or otherwise depicted), it should be appreciated that connections shown as providing AC power may have multi-phase connections, e.g., 3-phase connections, and the power conversion modules may be designed to convert AC power provided in multiple phases, as will be understood by those of ordinary skill in the art. Control connections (not shown) are provided to allow controller 8 to control the operation of AC/DC conversion module 4, DC/AC conversion module 5, DC/AC conversion module 6, and switches S1-S4. Although a single controller 8 is illustrated, any suitable number of controllers may be used.

In some embodiments, the AC/DC conversion module 4 may include a rectifier that converts the AC voltage produced by the generator G into a DC voltage, thereby providing a DC link to the grid-side of the power conversion system 100. As discussed above, such a rectifier may include line commutated devices in place of actively commutated devices on the generator side of the power conversion system. Implementing AC/DC conversion module 4 as a rectifier (as opposed to using actively commutated converter devices) may reduce the cost of the power conversion system and may improve power conversion efficiency at high power levels (e.g., at 50% or above rated power for the generator). However, the techniques described herein are not limited to implementing power conversion module 4 as a rectifier using line commutated devices, as in some embodiments power conversion module 4 may be implemented by one or more AC/DC conversion modules having actively commutated devices.

Power conversion system 100 may be configured to operate in multiple modes. In a first mode, controller 8 may configure the power converter(s) on the generator side (e.g., AC/DC conversion module 4) to perform AC/DC conversion and configure the power converter(s) on the grid side (e.g., DC/AC conversion modules 5 and 6) to perform DC/AC conversion. The first mode of operation may be characterized by given operating conditions monitored by controller 8 or assessed by another component of the system. In a second mode, controller 8 may configure one or more of the grid side power converters to perform AC/DC conversion and/or configure one or more of the generator-side power converters to perform DC/AC conversion in response to a change in the operating conditions.

According to the some embodiments, the operating conditions monitored include the power level produced by the generator. For example, controller 8 may configure the power conversion system to operate in the first mode when the power levels produced by the generator exceed a power threshold and may dynamically switch to the second mode when the power levels drop below the power threshold. Such dynamic reconfiguration may be desirable when AC/DC conversion module 4 is or includes a rectifier having one or more line commutated converters that operate efficiently at relatively high power levels, but less efficiently at low power levels (e.g., AC/DC conversion is performed using SCRs). As such, when the power level is sufficiently high (e.g., 50% or above rated power for the generator), AC/DC conversion may be performed using, for example, lower cost SCR devices that operate efficiently at relatively high power levels. When the power level produced by the generator drops below a threshold, one or more of the grid side converters may be reconfigured as a DC/AC converter and the power flow topology modified (e.g., by appropriately configuring the switches) to divert generator side AC power away from the rectifier (e.g., AC/DC conversion module 4) to pass through the one or more reconfigured grid side converter(s) instead, as discussed in further detail below.

Figure 3:
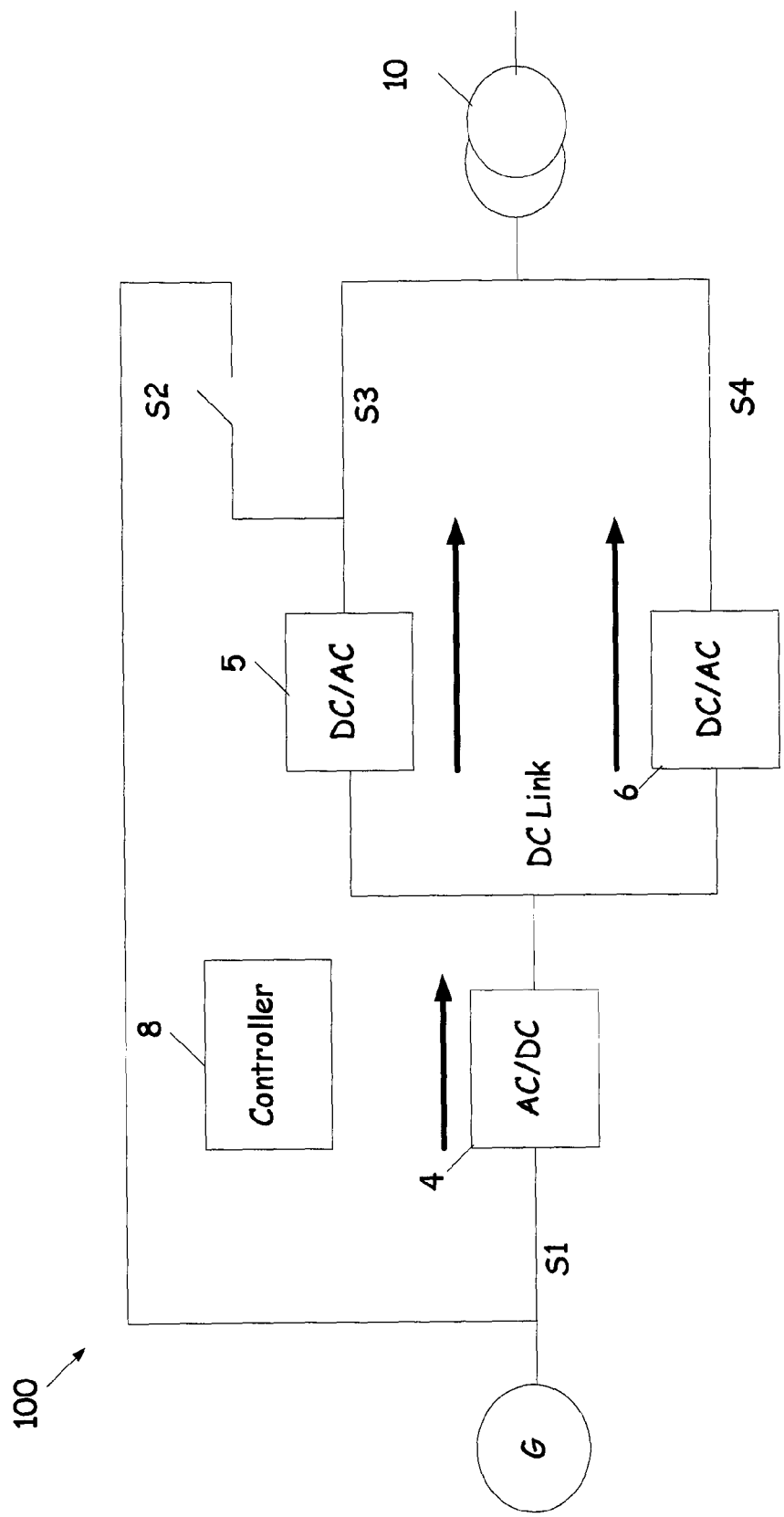
FIG. 3 shows a diagram of the power conversion system of FIG. 1 in a first mode of operation, according to some embodiments.

Thus, power conversion system 100 may be configured to operate in a plurality of different modes of operation. FIG. 3 shows a diagram of the power conversion system 100 in a first mode of operation, according to some embodiments. The first mode of operation may be a "high power" mode of operation that enables efficiently converting relatively high levels of power produced by the generator G into an AC voltage suitable to be provided to the grid 10. In the first mode of operation in FIG. 3, switches S1, S3 and S4 are closed, and switch S2 is open. The AC/DC conversion module 4 is operated to convert AC power produced by the generator G into a DC voltage at the DC link. In this example, the AC/DC conversion module is capable of converting substantially all of the power produced by the generator G. The DC/AC conversion module 5 and DC/AC conversion module 6 are operated in parallel to convert the DC voltage at the DC link into an AC voltage which is provided to the grid 10. Each of the DC/AC conversion modules 5 and 6 may be capable of converting approximately 50% of the power produced by the generator. In some embodiments, DC/AC conversion modules 5 and 6 may perform PWM (pulse width modulation) interleaving, which may enable increased power output to be provided. In some embodiments, one or more filters may be provided between the output of the power conversion system 100 to filter the power provided to the grid 10.

Figure 4:
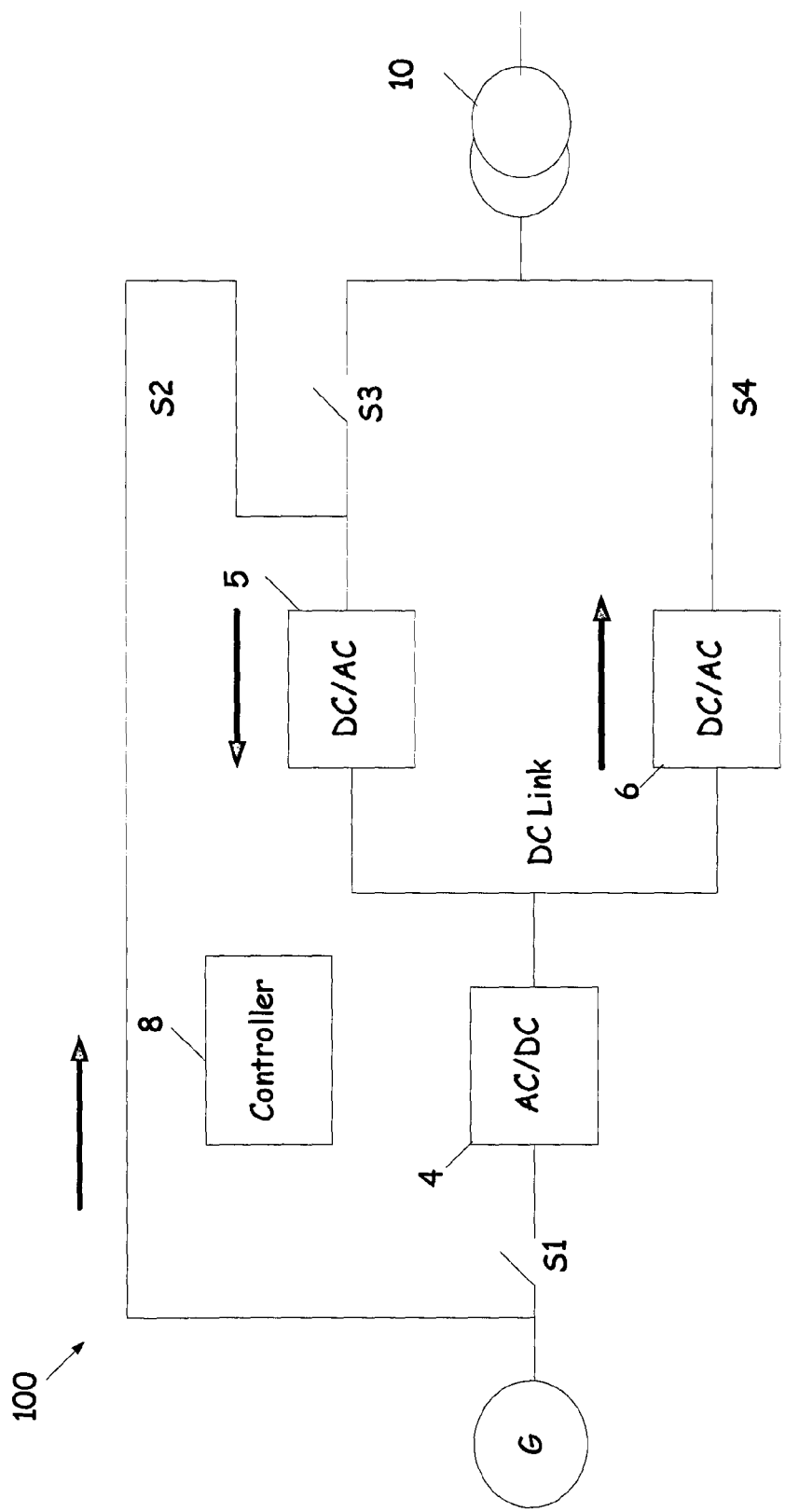
FIG. 4 shows a diagram of the power conversion system of FIG. 1 in a second mode of operation, according to some embodiments.

FIG. 4 shows a diagram of the power conversion system 100 in a second mode of operation, according to some embodiments. The second mode of operation may be a "low power" mode of operation that enables efficiently converting relatively low levels of power produced from the generator G. In the second mode of operation, switches S1 and S3 are open and switches S2 and S4 are closed. The AC/DC conversion module 4 may be bypassed, and the AC power produced by the generator G is provided to the DC/AC conversion module 5. Instead of operating DC/AC power conversion module 5 to perform DC/AC conversion, the power conversion module 5 is operated in reverse such that the power flows in the opposite direction through DC/AC conversion module 5. For example, the power flow topology may be modified such that power from the generator G is provided to the former output terminal of the power conversion module 5, and the power conversion module 5 performs AC/DC conversion to convert AC power from the generator G into a DC voltage at the DC link. The DC/AC conversion module 6 converts the DC voltage at the DC link into an AC voltage which is provided to the grid 10. In some embodiments, the mode of operation illustrated in FIG. 4 may enable converting relatively low levels of power produced by the generator G into an AC voltage suitable to be provided to the grid 10. For example, if power conversion modules 5 and 6 are each designed to handle approximately half of the maximum power flow from the generator G when operated in parallel, the second mode of operation may enable converting approximately 50% of maximum power.

As discussed above, controller 8 may control the operation of the power conversion system 100. Controller 8 may control the power conversion system 100 to operate in the first mode of operation or the second mode of operation, and to switch between the first and second modes of operation. In some embodiments, controller 8 may control the power conversion system 100 to operate in a "high power" mode of operation when the generator is operating at a sufficiently high power level, such as when the power level produced by the generator is at or above a power threshold. Any suitable threshold may be used. In some embodiments, the threshold may be 50%, and controller 8 may control the power conversion system 100 to operate in a "high power" mode of operation when the generator is operating at or above 50% of its rated output power. However, the techniques described herein are not limited to use of 50% as the threshold, as other suitable thresholds may be selected.

In some embodiments, controller 8 may control the power conversion system 100 to operate in a "low power" mode of operation when the generator is operating at a power level below the threshold. Any suitable metric may be used for determining whether to operate in the "low power" mode or the "high power" mode, such as generator output power, generator RPM, or another metric. As such, the power conversion system may be configured to utilize relatively low cost rectifiers for AC/DC conversion on the generator side (e.g., in place of more expensive actively commutated devices such as IGBT AC/DC converters) at generally high power levels (e.g., 50% or greater of rated power from the generator) and bypassed when the generator is producing relatively low power levels (e.g., less than 50% of rated power) in favor of using actively commutated grid side DC/AC converters reconfigured to perform AC/DC conversion. As such, a less expensive and/or more efficient power conversion system may be provided according to some embodiments, though realizing cost and/or efficiency improvements are not requirements.

Figure 5:
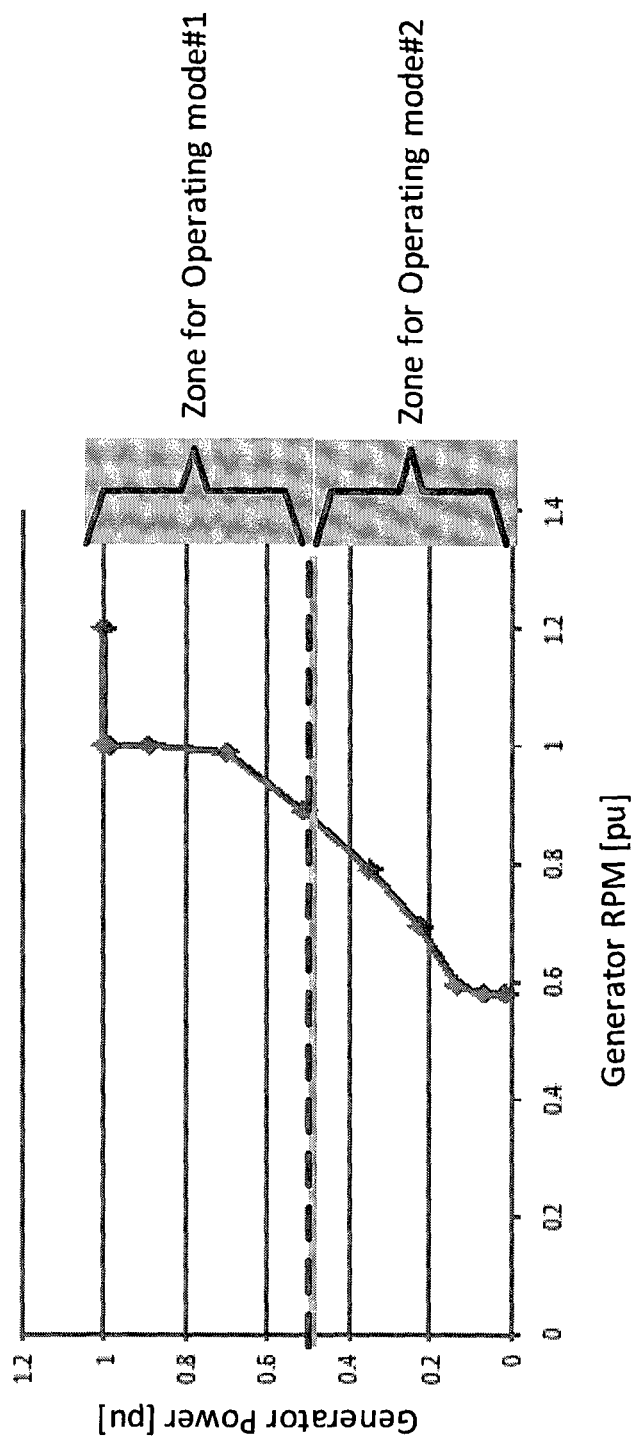
FIG. 5 shows a plot of generator output power vs. generator RPM, normalized to rated power and rated RPM, respectively, for an exemplary wind turbine generator.

FIG. 5 shows a plot of generator output power vs. generator RPM, normalized to rated power and rated RPM, respectively, for an exemplary wind turbine generator. FIG. 5 illustrates the use of a threshold of 50% generator output power for switching between the "high-power" and "low-power" modes of operation. In such a wind turbine generator, the threshold of 50% output power corresponds to an RPM of 87% of maximum. However, this is by way of illustration, as other generators may have different correlations between output power and generator RPM.

In some embodiments, the controller 8 may control the power conversion system 100 to switch between operating modes in a controlled manner. Such a transition sequence may include 1) reducing the power flow in appropriate power converters affected by the reconfiguration to zero, 2) changing the states of the switches as needed to place them in the open/closed state for the next mode of operation, 3) changing control parameters for one or more power converters to be reconfigured (e.g., power conversion module 5) to change the direction of power flow, and 4) ramping up power in the affected power converters according to the next mode of operation. Switching between operating modes in a controlled manner may avoid damaging components of the system. However, it should be appreciated that other ways of transitioning between configurations and/or power flow topologies may be used, as the aspects are not limited in this respect.

The inventors have also recognized and appreciated that enabling operation of a power conversion system in more than one mode of operation, as discussed above, can facilitate fault tolerance and/or redundancy. For example, if AC/DC conversion module 4 fails, the power conversion system 100 nonetheless may be operable using conversion modules 5 and 6 with, for example, conversion module 5 reconfigured as an AC/DC conversion module. In some embodiments, controller 8 may sense a failure of AC/DC conversion module 4, and, in response, may control the power conversion system 100 to operate in a mode of operation that bypasses AC/DC conversion module 4. It should be appreciated that a failed conversion module may correspond to a failure of one or more converters within the conversion module such that only a portion of the failed conversion module is bypassed.

As such, according to some embodiments, the operating conditions monitored to determine when the operation mode should be switched and/or the power flow topology modified include failure of either one or more generator side converters or one or more grid side converters. For example, when it is detected that a generator side converter has failed, one or more grid side converters may be reconfigured to perform AC/DC conversion and the power flow topology modified to divert power away from the failed generator side converter to pass through the one or more reconfigured grid side converters. Similarly, when it is detected that a grid side converter has failed, one or more generator side converters may be reconfigured to perform DC/AC conversion and the power flow topology modified to divert power away from the failed grid side converter to pass through the one or more reconfigured generator side converters, as also discussed in further detail below.

According to some embodiments, other operating conditions may be monitored such that when a given operating condition changes, is detected, or given operating conditions are met, controller 8 configures one or more generator side converters to switch to DC/AC operation and/or configures one more grid side converters to switch to AC/DC operation and modifies the power flow topology in view of the reconfiguration to achieve a desired power flow in converting AC power from the generator to AC power suitable for and expected by the grid to which the generator is to provide power, as the aspects are not limited to dynamically configuring the conversion modules and power flow topology in response to any particular operating condition or set of operating conditions.

Figure 6:
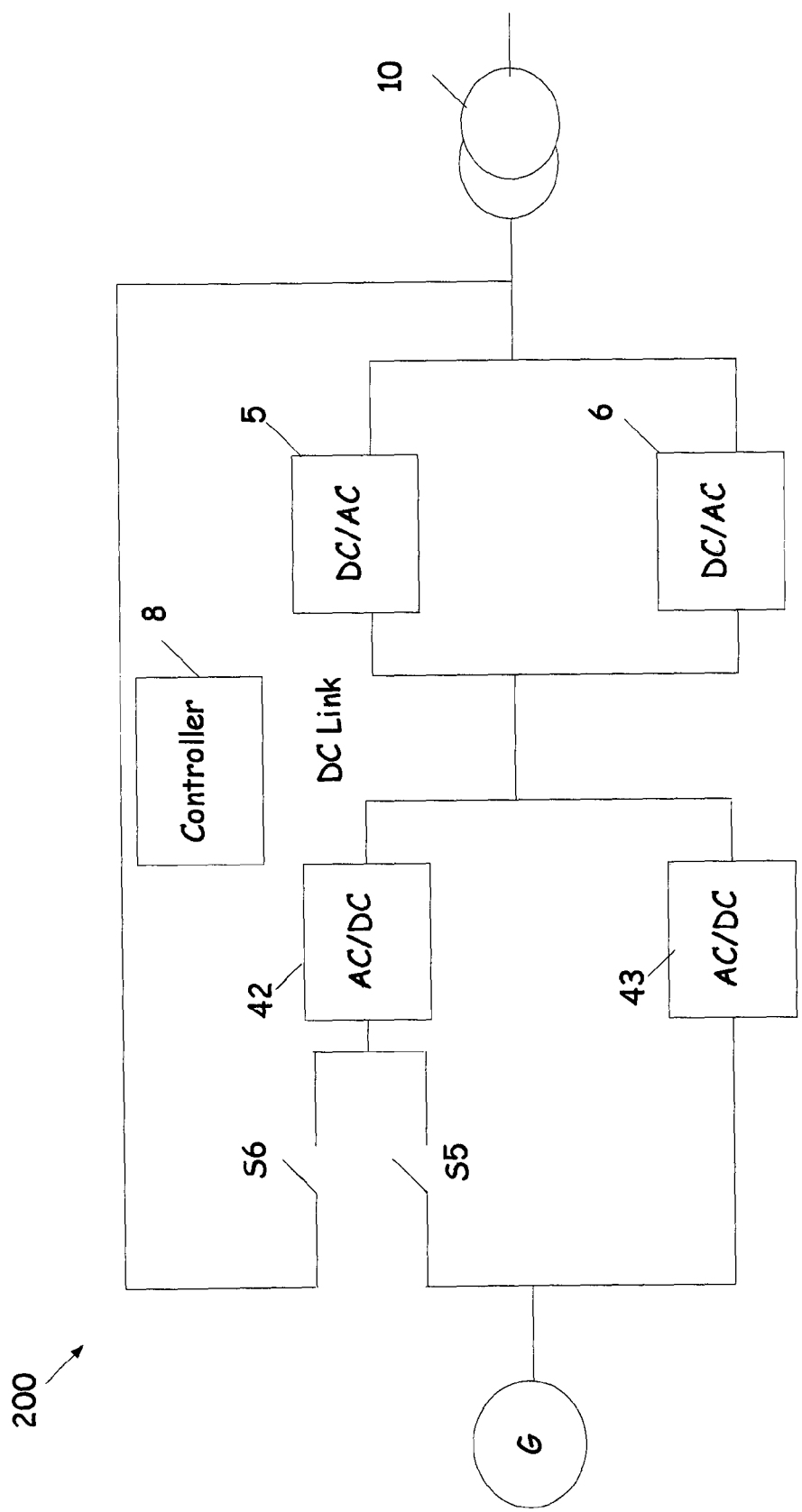
FIG. 6 shows a diagram of a power conversion system in which power flow may be reversed in a generator-side power conversion module, according to some embodiments.

FIG. 6 shows a diagram of a power conversion system 200 in which power flow through a generator-side power conversion module may be reversed, according to some embodiments. Power conversion system 200 includes an AC/DC conversion module 42, an AC/DC conversion module 43, a DC/AC conversion module 5, a DC/AC conversion module 6, switches S5 and S6 and a controller 8. Power conversion system 200 can be operated in different modes to change the power flow through the power conversion system 200. Providing the capability of operating the power conversion system 200 in different modes can provide fault tolerance in the case of failure of one or more power conversion modules, or portions of the power conversion modules.

Figure 7:
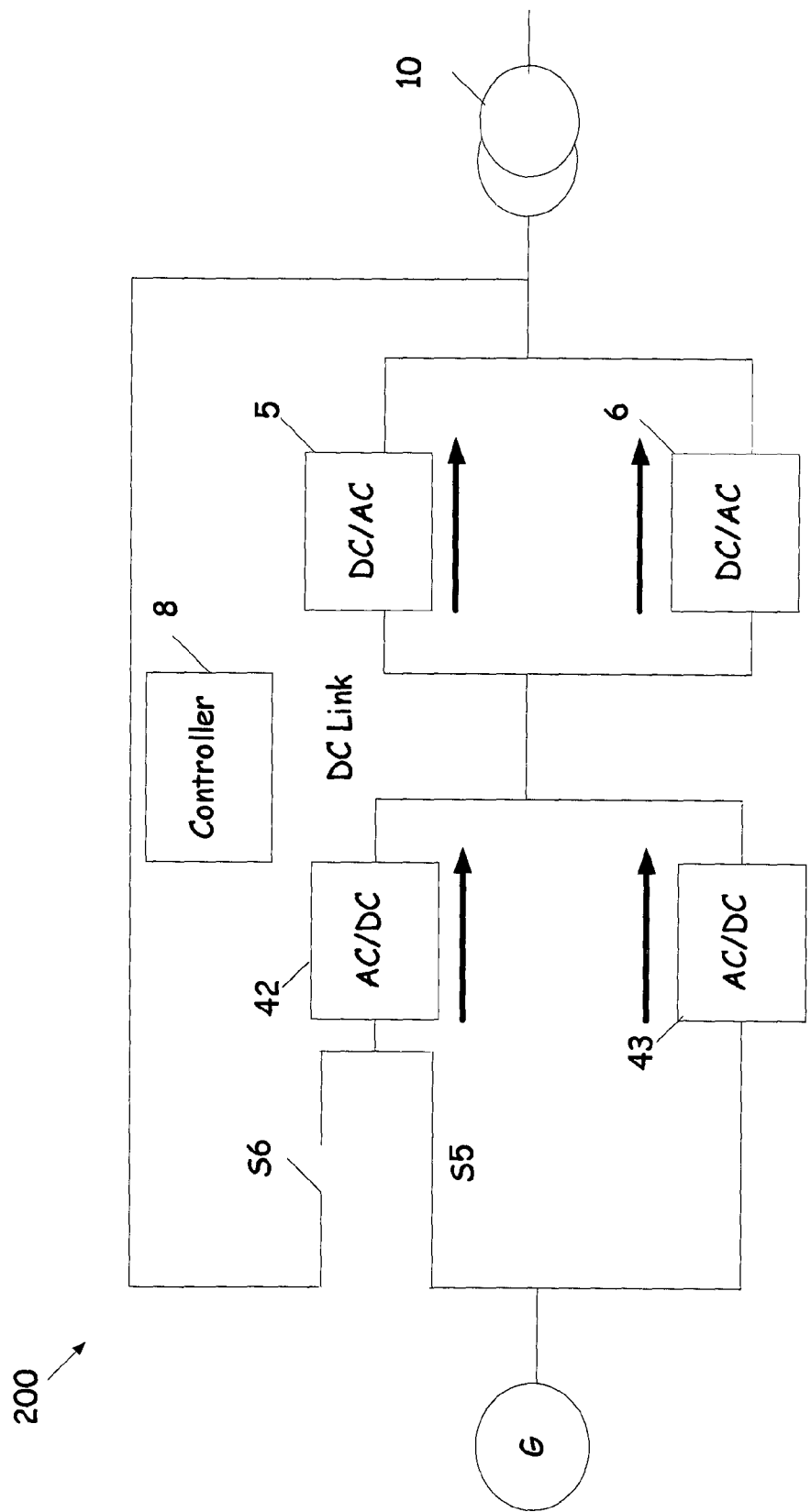
FIG. 7 shows a diagram of the power conversion system of FIG. 5 in a first mode of operation, according to some embodiments.

FIG. 7 shows a diagram of a power conversion system 200 in a first mode of operation. In the first mode of operation, switch S5 may be closed and AC/DC conversion modules 42 and 43 may be operated in parallel to convert AC power from the generator G into a DC voltage at the DC link. DC/AC conversion modules 5 and 6 may be operated in parallel to convert the DC voltage into AC power suitable to be provided to the grid 10. The first mode of operation may be a full power mode that enables converting up to the maximum amount of power that may be produced by generator G. Power conversion system 200 may provide fault-tolerance by controlling the power conversion system 200 to operate in a different mode in response to a failure of one or more power conversion modules, or portions thereof. For example, if the controller 8 detects a failure of DC/AC conversion modules 5 and/or 6, the controller 8 may control the power conversion system 200 to operate in a second mode of operation in which power flow is re-routed to compensate for the failed components, rather than having the wind turbine fail entirely or force a shut-down.

Figure 8:
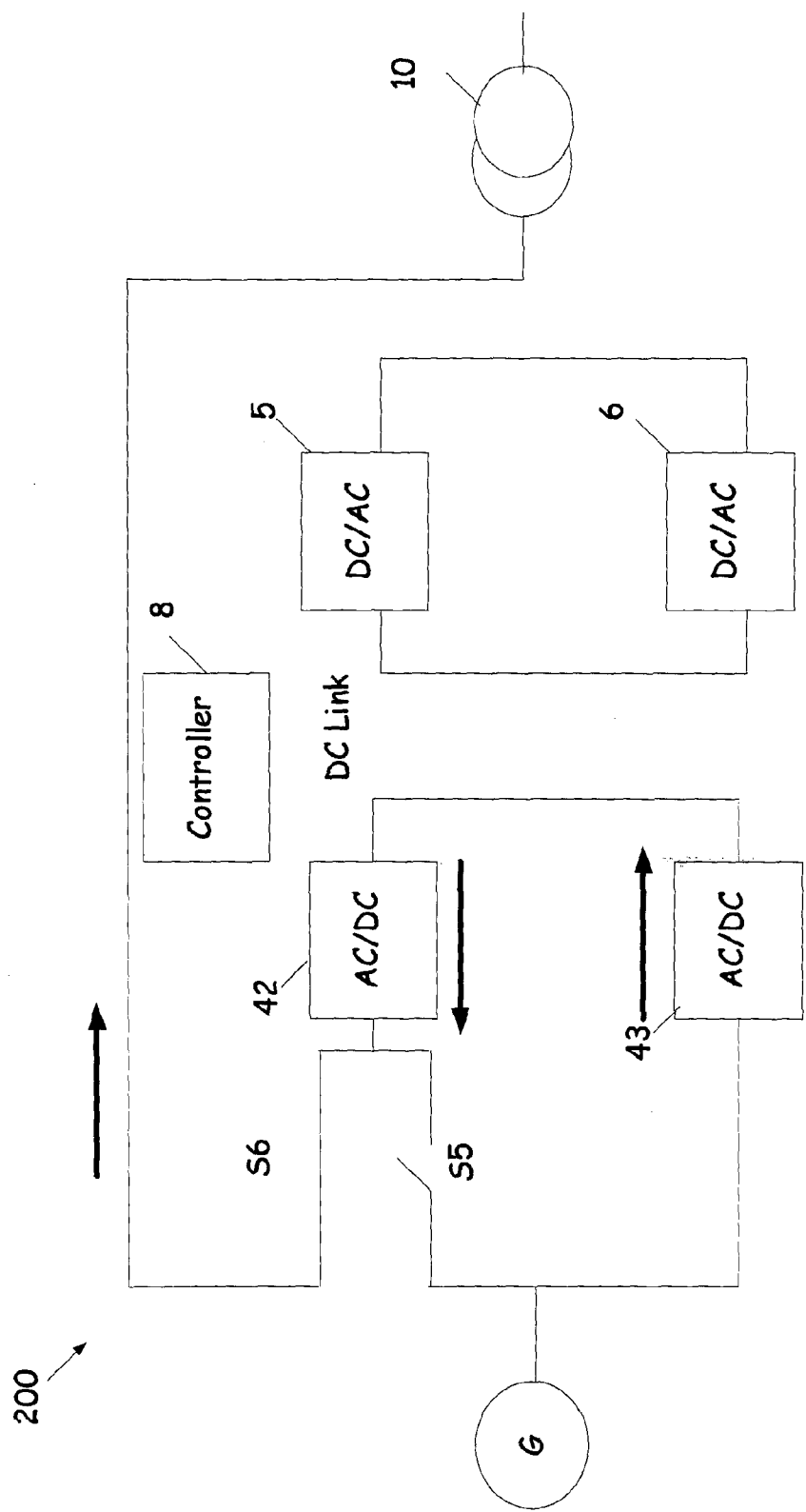
FIG. 8 shows a diagram of the power conversion system of FIG. 5 in a second mode of operation, according to some embodiments.

As illustrated in FIG. 8, in the second mode of operation switch S5 may be opened and switch S6 may be closed, and the AC/DC power conversion module 42 may be operated with power flow in the reverse direction such that it operates as a DC/AC power conversion module, and converts power from the DC link into AC power for the grid 10. The failed DC/AC conversion module(s) may be bypassed while power conversion continues, though perhaps at reduced conversion capacity. According to some embodiments, only the failed DC/AC conversion module(s) are bypassed, while in other embodiments one or more operational DC/AC conversion modules are also bypassed to balance the number of AC/DC converters and DC/AC converters in operation. Reconfiguring one or more power conversion modules and modifying the power flow topology may allow power conversion system 200 to continue to perform power conversion and permit the generator to continue to provide power to the grid, though the power output may be reduced by an amount related to the number of converters that have failed. As a result, the power conversion system can be enabled with a measure of fault tolerance due to the ability to reconfigure one or more power converters and modify the power flow topology of the power conversion system.

Figure 9:
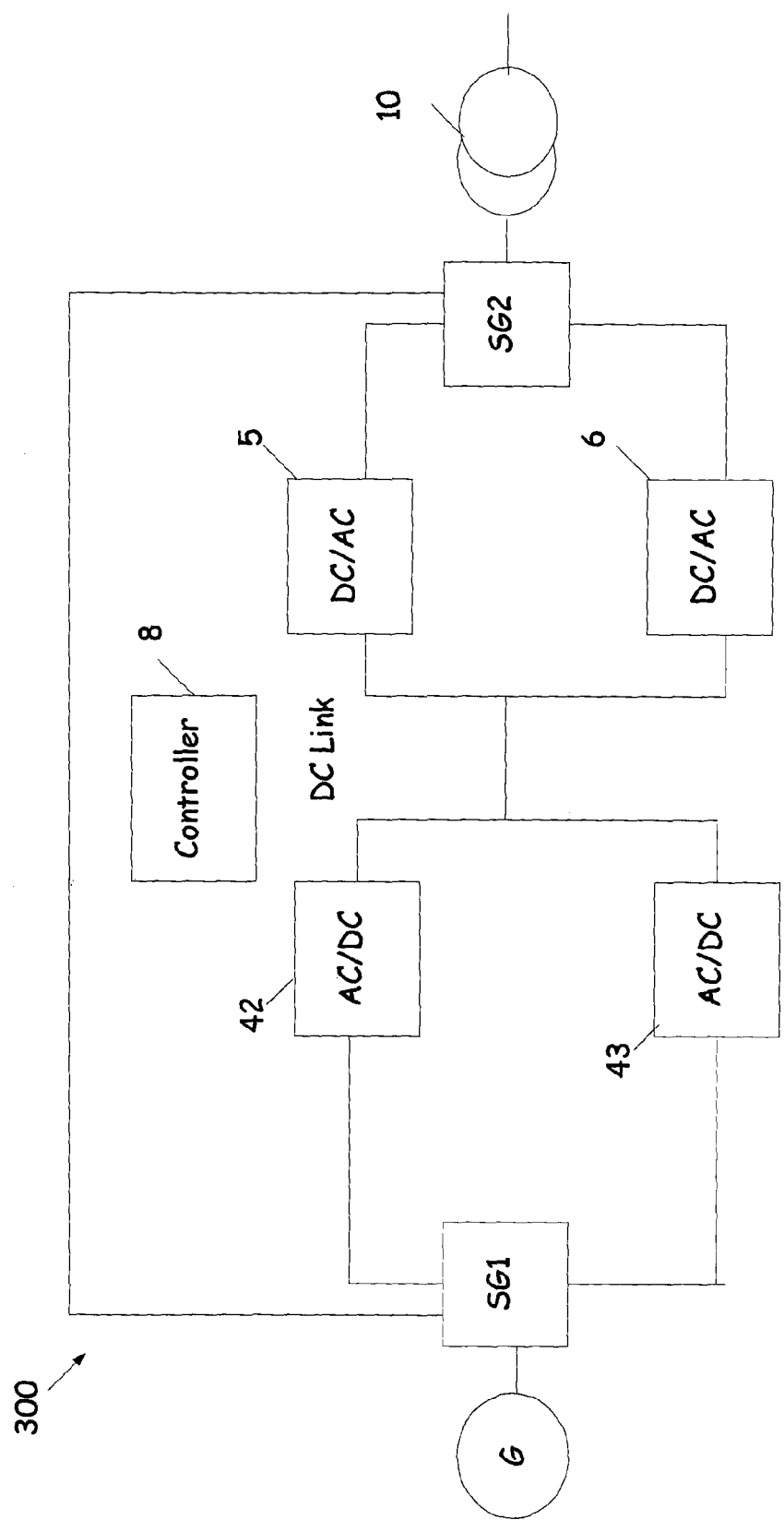
FIG. 9 shows a diagram of a power conversion system in which power flow may be reversed in a grid-side power conversion module and a generator-side power conversion module, according to some embodiments.

FIG. 9 shows a power conversion system 300 in which power flow may be reversed in a generator-side conversion module or a grid-side conversion module, according to some embodiments. Power conversion system 300 includes switching hardware SG1 and SG2 to make connections in the system depending on its mode of operation. System 300 may be configured to operate in a plurality of modes of operation to provide fault tolerance in the case of failure of one or more power conversion modules. For example, in the case of failure of one or more of AC/DC conversion modules 42 and 43, the power conversion system 300 may enter a mode of operation such that AC/DC conversion modules 42 and/or 43 are bypassed and power flows in a manner as illustrated in FIG. 4, through conversion modules 5 and 6. In the case of failure of one or more of DC/AC conversion modules 5 and 6, the power conversion system 300 may enter a mode of operation such that AC/DC conversion modules 5 and/or 6 are bypassed and power flows in a manner as illustrated in FIG. 8, through conversion modules 42 and 43. If all power conversion modules are operational, the system may perform power conversion with power conversion modules operating in parallel, as shown in FIG. 7. As discussed above, failed conversion modules (or portions thereof) may be bypassed exclusively or one or more operational conversion modules (or portions thereof) may also be bypassed to balance the number of converters performing AC/DC and DC/AC conversion.

Figure 10:
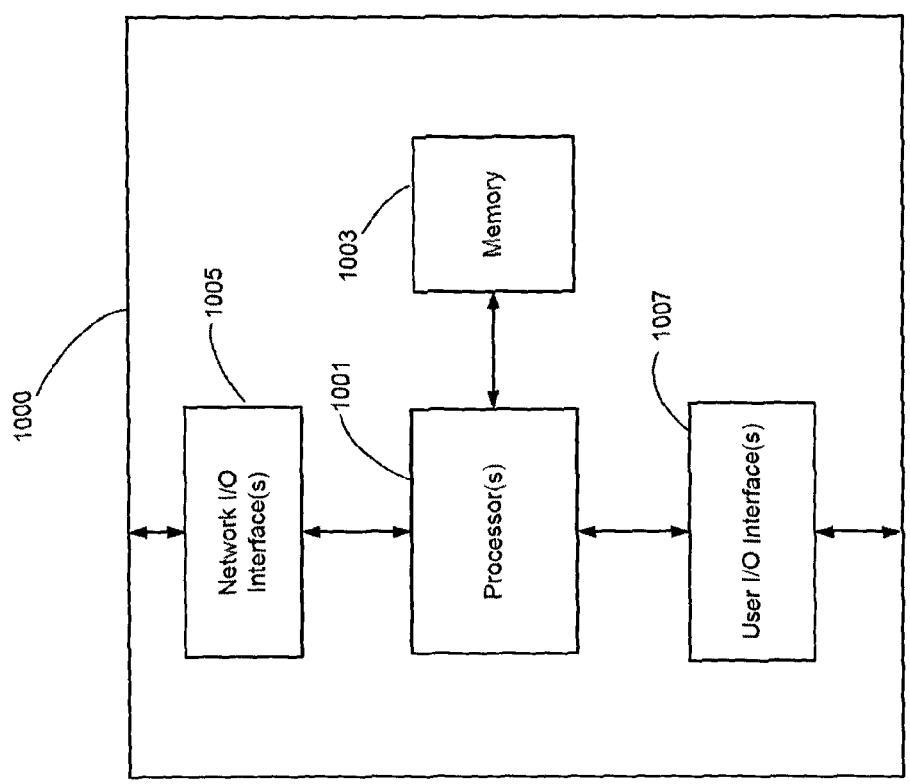
FIG. 10 is a block diagram of an illustrative computing device that may control operation of a power conversion system.

In some embodiments, techniques described herein may be carried out using one or more computing devices. Embodiments are not limited to operating with any particular type of computing device. FIG. 10 is a block diagram of an illustrative computing device 1000 that may be used to implement any of the above-described techniques, such as controller 8. Computing device 1000 may include one or more processors 1001 and one or more tangible, non-transitory computer-readable storage media (e.g., memory 1003). Memory 1003 may store, in a tangible non-transitory computer-recordable medium, computer program instructions that, when executed, implement any of the above-described functionality. Processor(s) 1001 may be coupled to memory 1003 and may execute such computer program instructions to cause the functionality to be realized and performed.

Computing device 1000 may also include a network input/output (I/O) interface 1005 via which the computing device may communicate with other computing devices (e.g., over a network), and may also include one or more user I/O interfaces 1007, via which the computing device may provide output to and receive input from a user.

The above-described embodiments can be implemented in any of numerous ways. For example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-discussed functions of one or more embodiments. The computer-readable medium may be transportable such that the program stored thereon can be loaded onto any computing device to implement aspects of the techniques discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A dual-mode power conversion system for converting electrical power produced by a generator, the power conversion system comprising:
    at least one first line commutated power converter configured to convert alternating current from the generator to direct current;
    at least one second power converter capable of being configured to convert the direct current to alternating current or to convert alternating current from the generator to direct current; and
    at least one controller configured to, when a power level exceeds a threshold power level, configure the at least one first line commutated power converter to convert alternating current from the generator to direct current and configure the at least one second power converter to convert the direct current to alternating current and, when the power level is below the threshold power level, bypass the at least one first line commutated power converter and reconfigure the at least one second power converter to convert alternating current from the generator to direct current.

2. The power conversion system of claim 1, wherein the at least one first line commutated power converter comprises at least one silicon-controlled rectifier and wherein the at least one second power converter comprises at least one actively commutated power converter.

3. The power conversion system of claim 2, wherein the at least one actively commutated power converter comprises at least one insulated gate bipolar transistor power converter.

4. The power conversion system of claim 1, wherein the at least one first line commutated power converter comprises a plurality of first line commutated power converters to convert alternating current from the generator to direct current, and the at least one second power converter comprises a first plurality of second power converters and a second plurality of second powers converters, and wherein the at least one controller is configured to, when the power level exceeds the threshold power level, configure the plurality of first line commutated power converters to convert alternating current from the generator to direct current and configure the first plurality of second power converters and the second plurality of second power converters to convert the direct current to alternating current and, when the power level is below the threshold power level, bypass the plurality of first line commutated power converters and reconfigure the first plurality of second power converters to convert alternating current from the generator to direct current.

5. The power conversion system of claim 1, wherein the power conversion system converts power from the generator to provide power to a grid, and wherein the at least one second power converter converts the direct current to alternating current suitable for the grid.

6. A method of converting electrical power produced by a generator using a dual-mode power conversion system comprising at least one first line commutated power converter configured to convert alternating current from the generator to direct current and at least one second power converter capable of being configured to convert the direct current to alternating current or to convert alternating current from the generator to direct current, the method comprising:
    when a power level exceeds a threshold power level:
        configuring the at least one first line commutated power converter to convert alternating current from the generator to direct current; and
        configuring the at least one second power converter to convert the direct current to alternating current; and
    when the power level is below the threshold power level:
        bypassing the at least one first line commutated power converter; and
        reconfiguring the at least one second power converter to convert alternating current from the generator to direct current.

7. The method of claim 6, further comprising monitoring a power level produced by the generator to determine whether the power level exceeds or is below the threshold power level.

8. The method of claim 7, wherein the at least one first line commutated power converter comprises at least one silicon-controlled rectifier and wherein the at least one second power converter comprises at least one actively commutated power converter.

9. The method of claim 8, wherein the at least one actively commutated power converter comprises at least one insulated gate bipolar transistor (IGBT) power converter.

10. The method of claim 6, wherein the at least one first line commutated power converter comprises a plurality of first line commutated power converters to convert alternating current from the generator to direct current, and the at least one second power converter comprises a first plurality of second power converters and a second plurality of second powers converters, and wherein, when the power level exceeds the threshold power level, configuring the plurality of first line commutated power converters to convert alternating current from the generator to direct current and configure the first plurality of second power converters and the second plurality of second power converters to convert the direct current to alternating current and, when the power level produced by the generator is below the threshold power level, bypassing the plurality of first line commutated power converters and reconfiguring the first plurality of second power converters to convert alternating current from the generator to direct current.

11. The method of claim 6, comprising converting power from the generator to provide power to a grid, wherein the at least one second power converter converts the direct current to alternating current suitable for the grid.

12. The power conversion system of claim 1, wherein the threshold power level is approximately 50% of the rated power of the generator.

13. The method of claim 6, wherein the threshold power level is approximately 50% of the rated power of the generator.

* * * * *